United States Patent Office 3,007,981
Patented Nov. 7, 1961

3,007,981
PROCESS FOR THE SEPARATION OF HYDROCARBONS
Bertsil Burgess Baker, West Chester, Pa., and Donald Fred Knaack, Wilmington, Del., assignors to E. I. du Pont de Nemours and Company, Wilmington, Del., a corporation of Delaware
No Drawing. Filed Apr. 26, 1960, Ser. No. 24,668
9 Claims. (Cl. 260—677)

The present invention relates to a process for separating hydrocarbons, and, more particularly, to a process for separating hydrocarbons through selective absorption.

In a recent United States Patent, 2,913,505, of H. G. Van Raay and Ulrich Schwenk, issued November 17, 1959, a novel process for the separation of olefinic hydrocarbons is described which comprises the selective absorption of olefinic hydrocarbons when admixed with saturated hydrocarbons by aqueous solutions of silver fluoborate and silver fluosilicate or combinations thereof. Hydrocarbon mixtures containing olefins are passed through a solution of the salt which selectively absorbs the olefins in the mixture. On heating of the solution, the absorbed olefins are released and, thus, are separated to give rise to olefins of high plurity suitable for use in polymerizations or other reactions. One of the disadvantages of this otherwise highly efficient process is the cost of the silver salts necessary to obtain the selective absorption of the olefin.

It is, therefore, an objective of the present invention to provide a more economical hydrocarbon separation process using silver salts. It is a further object of the present invention to provide a hydrocarbon separation process which not only is capable of separating olefins from saturated hydrocarbons, but separating cis-substituted olefins from trans-substituted olefins and monoolefins from diolefins. Other objects will become apparent hereinafter.

The objects of the present invention are accomplished by passing a mixture of the fluid hydrocarbons to be separated, said mixture being from the class consisting of mixtures of saturated hydrocarbons and olefins, mixtures of cis- and trans-olefins, and mixtures of monoolefins and diolefins, through an aqueous solution of a silver salt selected from the class consisting of silver fluoborates, silver fluosilicates and combinations thereof, and a stable metal salt wherein the cation has a charge to ionic radius ratio of greater than one, and wherein the anion is selected from the group consisting of fluoborates and fluosilicates. Thus, in accordance with the present invention, it was discovered that combinations of metal salts where the anion is a fluoborate or a fluosilicate, and the cation is a combination of silver and such metals as calcium, magnesium, lithium, strontium and zinc, are synergistically improved in absorptive capacity over the absorptive capacity of the metal salt solutions when used separately.

The synergistic improvement of olefin absorption is obtained when the secondary metal salt, wherein the cation has a charge to ionic radius ratio of greater than one and the anion is either a fluosilicate or a fluoborate is combined with the silver salt in the aqueous solution. The ratio of valence or charge to ionic radius is readily calculated from published data. Thus, both can be found in Therald Moeller's advanced textbook "Inorganic Chemistry," published by John Wiley and Sons, Inc., 1952, on pages 140 to 142. In particular, the metals in Group II of the Periodic Table of Elements, found in said textbook, having atomic numbers from 4 to 56 inclusive, and copper, lead and lithium, are highly suitable. Although not completely substantiated, it is believed that the synergistic activity of the secondary metal fluoborate or fluosilicate wherein the metal has a charge to ionic radius ratio of greater than one is the ability of these ions to compete with the silver for the water of hydration, lowering the hydration of the silver and thereby making it more available for complexing with the olefins. It is feasible to use more than one of the secondary salts in combination with the silver salt, although no particular improvement is noticed thereby. Silver fluosilicates may be employed in combination with secondary metal fluoborates and vice versa, silver fluoborates can be employed in combination with the fluosilicates of such metals as magnesium, calcium, sodium, lithium and zinc. Similarly, mixtures of silver or secondary metal fluosilicates and fluoborates may be employed. The ratio of the silver salt to the secondary metal salt is not critical, and some improvement in absorptive capacity is noted at any ratio of the two components. However, since the silver salt, in general, has a substantially greater absorptive capacity than the added secondary metal salt, many of which have very little absorptive capacity when employed alone, it is, in general, preferred to employ greater than 1:1 molar ratios of the silver salt to the secondary metal salt. A highly suitable range of ratios is from 1:1 to 10:1. The overall concentration of the secondary metal salts in the aqueous medium is similarly not critical, the synergism being observed in dilute as well as in concentrated solution. Optimum concentrations are determined by the circumstances under which the absorption process of the present invention is used. In general, the absorptive capacity increases with increasing concentration and, hence, for economic reasons, it is preferred to employ concentrations varying from 4 to 12 molar on the basis of the silver ion.

The process of the present invention is characterized by extreme simplicity of operation in that it is only necessary to pass mixtures of olefins and saturated hydrocarbons through an aqueous solution of combinations of the silver salt and the secondary metal salts as described hereinabove, and thereafter heat said aqueous solution to release the absorbed olefins. The absorption generally takes place at room temperature, although higher or lower temperatures, such as varying from 0° to 50° C. may be employed. The desorption of the olefins occurs at temperatures of approximately 80° and higher at atmospheric pressures. Instead of heating, desorption can also be achieved by reduction in pressure or a combination of both. Absorption trains, such as shown in U.S. 2,913,505 may be similarly designed and used for the continuous operation of the process of the present invention. The design of and variations of the design of such absorption trains is well within the scope of one skilled in the art. Certain impurities, such as carbon dioxide, carbon monoxide, oxygen, hydrogen, nitrogen or noble gases, have only a very small effect on the effectiveness of the described separation. Where such impurities become major components of the mixture to be separated, it may be desirable to remove these impurities in a prior step. It has been found that the concentration of the acetylene should be maintained at a low level in order to prevent the formation of silver acetylide. Concentrations of acetylene should remain on the average below 1%. Where the concentration of acetylene in the gas to be separated is continuously at levels above 1%, it is preferred to previously hydrogenate the acetylene to yield such compounds as can be absorbed and separated.

The following tables show the improvement obtained by employing a combination of the silver salt with a secondary metal fluorborate or fluosilicate, wherein the metal ion has a charge to ionic radius ratio of greater than one. The data was obtained by passing a stream of the hydrocarbon indicated through a lithium nitrate solution of molarity equivalent to that of the silver salt to prevent water losses and then through the solution indicated in the table, maintained in a standard laboratory glass trap. The hydrocarbon was continuously passed through the glass trap until no further absorption, as measured by weight increase, was observed. Adjustment of the water content of the hydrocarbon to be absorbed assured accurate weight measurement of olefin absorption by the silver salt solution. Unless otherwise indicated, these measurements were carried out at 24° C.

Table I shows the quantity of ethylene absorbed by passage of ethylene through two molar solutions of silver fluoborate and combinations of silver fluoborate with secondary metal fluoborates disclosed hereinabove as synergistically active. As can be seen from the table, a substantial improvement in absorption is obtained by the use of such compounds as calcium fluoborate, zinc fluoborate and magnesium fluorborate. It is, thus, apparent that the added metal ion is responsible for the improvement of the absorptive capacity of the silver fluoborate.

and magnesium fluoborate solutions by themselves. The table further shows that the absorption process of the present invention can be employed for wide varieties of olefins and diolefins. As can be seen from the table, in the absorption of butadiene at concentrations above 6 molar of silver fluoborate, a solid precipitate of butadiene and the silver fluoborate is formed. This makes it possible not only to absorb butadiene from mixtures with saturated hydrocarbons, but also to separate a diene from monoolefins such as butene-1, which does not form the solid precipitate. The solid precipitate is readily decomposed into butadiene and the silver fluoborate by heating at elevated temperatures necessary to release absorbed olefins. In addition, the table also shows the separation of olefins differing in their steric hindrance. Thus, the table shows that cis-butene-2 is much more readily absorbed than trans-butene-2, and, hence, a mixture of these two would result in the separation of cis- and trans-butene, since the cis-butene would replace absorbed trans-butene.

*Table III*

| Absorption Solution | Moles of Olefin Absorbed per Liter of Initial Solution at 24°±1° C. | | | | | | | |
|---|---|---|---|---|---|---|---|---|
| | Ethylene | Propylene | 1,3-Butadiene | Butene-1 | Isobutylene | cis-Butene-2 | trans-Butene-2 | Cyclohexene |
| 2.0 M AgBF$_4$ | 0.84 | 0.76 | 1.07 | 0.95 | 0.62 | 0.90 | 0.33 | 0.70 |
| 2.0 M AgBF$_4$—1.8 M Mg(BF$_4$)$_2$ | 1.47 | 1.49 | 1.62 | 1.75 | 1.22 | 1.75 | 0.69 | 1.78 |
| 6.1 M AgBF$_4$ | 4.47 | 4.58 | 5.20 | 5.98 | 5.20 | 6.39 | 2.50 | 6.16 |
| 3.6 M Mg(BF$_4$)$_2$ | 0.073 | | | 0.0492 | 0.076 | | | |
| 6.1 M AgBF$_4$—1.8 M Mg(BF$_4$)$_2$ | | 7.82 | Solid ppt. formed | 8.85 | 8.11 | 9.70 | 6.67 | 10.92 |
| 6.17 M AgBF$_4$—2.3 M Mg(BF$_4$)$_2$ | 7.54 | | | | | | | |

*Table I*

| Solution | Charge to Radius—Ratio | Ethylene Absorbed, Moles/g. ion Ag |
|---|---|---|
| 2 M AgBF$_4$ | | 0.42 |
| 2 M Ag BF$_4$ | | 0.43 |
| 2 M NaBF$_4$ | 1.05 | |
| 2 M AgBF$_4$ | | 0.49 |
| 2 M Ba(BF$_4$)$_2$ | 1.48 | |
| 2 M AgBF$_4$ | | 0.52 |
| 2 M LiBF$_4$ | 1.67 | |
| 2 M AgBF$_4$ | | 0.56 |
| 2 M Sr(BF$_4$)$_2$ | 1.77 | |
| 2 M AgBF$_4$ | | 0.68 |
| 2 M Ca(BF$_4$)$_2$ | 2.01 | |
| 2 M AgBF$_4$ | | 0.69 |
| 2 M Zn(BF$_4$)$_2$ | 2.7 | |
| 2 M AgBF$_4$ | | 0.77 |
| 2 M Mg(BF$_4$)$_2$ | 3.08 | |

Table II shows the low absorption obtained with saturated hydrocarbons using the secondary metal salt alone. In the presence of unsaturated hydrocarbons, these slightly absorbed saturated hydrocarbons are substantially replaced by the unsaturated hydrocarbons.

*Table II*

| Solution | Ethane Absorption, moles/l.[1] | Butane Absorption, moles/l. |
|---|---|---|
| 3.6 M Mg(BF$_4$)$_2$ | 0.0383 | 0.0517 |
| 7.2 M LiBF$_4$ | 0.0033 | 0.0432 |
| 3.8 M Ca(BF$_4$)$_2$ | 0.00016 | 0.0492 |

[1] Moles of hydrocarbon gas/liter of salt solution.

In Table III, the absorption of various olefins using silver fluoborate alone, combinations of silver fluoborate and magnesium fluoborate, and magnesium fluoborate alone is shown at various concentration levels. This table demonstrates various properties of the absorption system of the present invention. Thus, it is seen, in general, that proportionately increased absorption occurs at higher concentration levels. It is, furthermore, shown that the absorptivity of the combination of silver fluoborate and magnesium fluoborate is greater than the additive absorptive capacity of silver fluoborate solutions The invention is further illustrated by the following example employing a mixture of saturated and unsaturated olefins.

Into a glass vessel was charged 10 ml. of a 6.1 molar silver fluoborate, 1.8 molar magnesium fluoborate solution. To this solution was then added a 20 ml. mixture of 1:1 cyclohexane and cyclohexene. This mixture was agitated at room temperature until no further absorption took place. The mixture was separated. The aqueous layer was heated to 95° C. at which temperature the organic component distilled off. The organic distillate was found to be cyclohexene, containing no cyclohexane as detectable by infrared analysis. The cyclohexene separated comprised approximately 70% of the original cyclohexene in the mixture. The remaining non-absorbed organic phase was analyzed and found to contain all of the cyclohexane originally in the mixture of cyclohexene and cyclohexane.

Substantially the same results are obtained in the above example if silver fluosilicate is employed instead of silver fluoborate, or if a combination of silver fluosilicate and magnesium fluosilicate is employed, or if a combination of silver fluoborate and magnesium fluosilicate is employed.

The above-described results have demonstrated that the process of the present invention is extremely versatile in the separation of both liquid and gaseous hydrocarbons, i.e., fluid hydrocarbons. The recovery of the adsorbed olefin is substantially complete, particularly when temperatures around 100° C. and reduced pressures are employed. Little or no loss of the silver fluoborate is found to occur when the process of the present invention is employed in a continuous operation whereby the absorption solution is recirculated from a counter-flow adsorption tower to a stripper and back into the absorption tower.

We claim:
1. A process for separating fluid hydrocarbon mixtures selected from the group consisting of mixtures of saturated hydrocarbons and olefinic hydrocarbons, monoolefins and diolefins, and mixtures of olefins differing in steric hindrance which comprises bringing said mixture into contact with an aqueous solution of a silver salt selected from the group consisting of silver fluoborate, silver fluosilicate and combinations thereof, and a metal salt wherein the cation is a metal of Group II of the Periodic Table of Elements and has an atomic number from 4 to 56 inclusive, and the anion is selected from the group consisting of fluoborates, fluosilicates and combinations thereof.

2. A process for the separation of a fluid olefinic hydrocarbon from a fluid hydrocarbon mixture containing said olefinic hydrocarbon, which comprises bringing said mixture into contact with an aqueous solution of a silver salt selected from the group consisting of silver fluoborates, silver fluosilicate and combinations thereof, and a metal salt wherein the cation is a metal of Group II of the Periodic Table of Elements and has an atomic number from 4 to 56 inclusive, and the anion is selected from the group consisting of fluoborates, fluosilicates and combinations thereof.

3. The process set forth in claim 2 wherein the silver salt is used in combination with a magnesium salt.

4. The process set forth in claim 2 wherein the silver salt is used in combination with a zinc salt.

5. The process set forth in claim 2 wherein the aqueous solution brought into contact is heated to liberate the olefin absorbed.

6. The process for separating a fluid olefinic hydrocarbon from a fluid hydrocarbon mixture containing said olefinic hydrocarbon which comprises bringing said hydrocarbon mixture into contact with an aqueous solution of a silver fluoborate and a metal fluoborate wherein the metal is selected from metals in Group II of the Periodic Table of Elements, having atomic numbers of 4 to 56 inclusive, and thereafter heating said solution to liberate the olefin absorbed.

7. The process set forth in claim 6 wherein the metal fluoborate is magnesium fluoborate.

8. The process set forth in claim 6 wherein the molar ratio of silver to metal is from 1:1 to 10:1.

9. The process set forth in claim 6 wherein the concentration of the silver in the aqueous phase is greater than two molar.

References Cited in the file of this patent

UNITED STATES PATENTS

| | | |
|---|---|---|
| 2,391,404 | Friedman et al. | Dec. 25, 1945 |
| 2,471,550 | Shaw | May 31, 1949 |
| 2,523,681 | Cole | Sept. 26, 1950 |
| 2,913,505 | Van Raay et al. | Nov. 17, 1959 |